Patented Apr. 12, 1927.

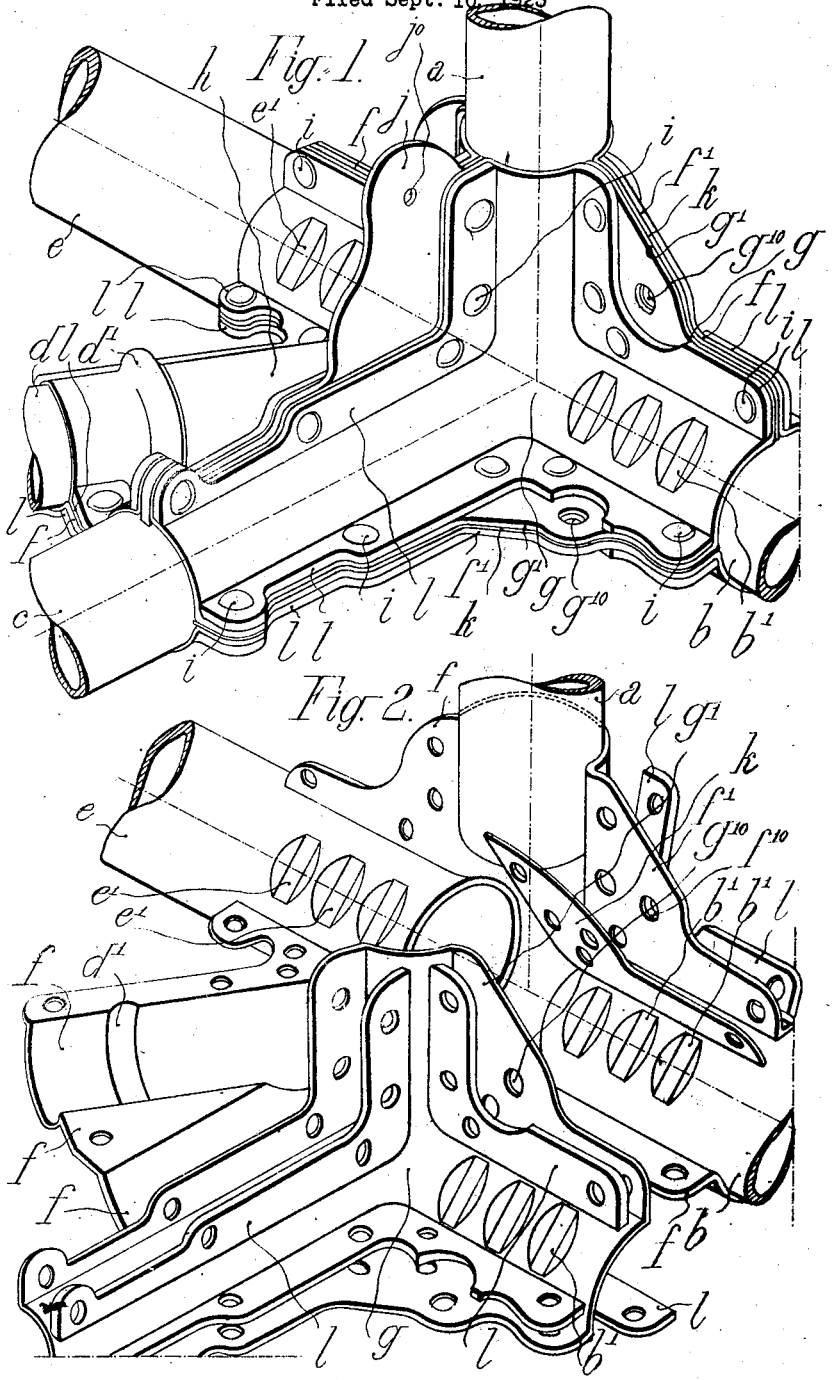

1,623,956

UNITED STATES PATENT OFFICE.

FELIX AMIOT, OF COLOMBES, FRANCE.

CONNECTING MEMBER.

Application filed September 10, 1923, Serial No. 661,974, and in Belgium November 22, 1922.

This invention relates to joints or connecting members for assembling parts, and refers more particularly although not exclusively to joints or connections for aircraft, as it is in their case that the invention appears to possess the greatest utility.

The principal object of the invention is so to construct joints of the kind in question that they are more rigid and cheaper to produce than has hitherto been the case.

According to the general principle of the invention, the parts to be connected by means of the joints are gripped by their extremities or by means of extensions or projections carried by their extremities by means of members forming a sort of junction or connecting box, such members being preferably formed by pressing or stamping and being connected together by any suitable means so as to form an integral whole.

The invention also refers to certain constructional details which may be combined with the principal construction just mentioned and which will be more fully described hereafter.

In order that the invention may be clearly understood, it will now be described with reference to the accompanying drawing, but it is to be observed that the description and drawing are given merely by way of example.

Figs. 1 and 2 of the drawing are both perspective views of a joint or connecting member for assembling the parts of the fuselage of an aeroplane, the said joint being constructed according to the invention. Fig. 1 shows the complete joint whilst Fig. 2 shows certain of the parts of the joint ready to be fitted in position.

The form of the invention shown in the drawing illustrates more particularly a joint for assembling the tubes and stays of the fuselage of an aeroplane, and the construction is substantially as follows:—

In the first place considering only the tubes, and the means for connecting, for example, five such tubes $a$, $b$, $c$, $d$ and $e$, a sort of junction or assembly box is formed from sections obtained by pressing or stamping. One of these sections $f$ is provided with recesses or seatings which are of such size and so directed with respect to one another that they are adapted to receive a portion of the extremities of the tubes to be connected together. A plurality of other box elements are also provided, two such elements $g$ and $h$ being shown at Fig. 1. These elements are so formed that they can be fitted over the extremities of the tubes and close them in their seating. The elements are provided with edges or flanges by means of which they can be attached together in any suitable way, for instance by rivets $i$. These flanges are preferably arranged in planes which are at right angles to each other.

In the case of tubes, such as $a$ and $c$ which work under compression and in the case of tubes, such as $b$, $d$ and $e$ which work under tension, means are provided for securing them properly in position. In the first instance, means may be provided in connection with the extremities of the tubes and the corresponding sockets for holding them against longitudinal movement relatively to one another as for instance providing punched up portions as shown at $b^1$ and $e^1$, for the tubes $b$ and $e$. In the second case and as shown at $d^1$ a channel or moulding may be provided for the tube $d$. It will be noted that in either of these constructions, the securing means ($b^1$, $e^1$, or $d^1$) is integral with the socket ($b$, $e$ or $d$, respectively), thus avoiding any weakening of the socket and any strains that might result from a break in the continuity of the material forming the socket.

I cases where it is desired to connect or assemble in addition to the five tubes, a stay or tensioning wire (not shown), which is to be connected at the angle of the two tubes, the axes of which are supposed to be in the same plane, and which, when produced, intersects the neutral axes, also produced, of the said tubes, the following construction may be adopted.

A junction member or box is provided, very similar to the one just described, but comprising elements so formed and arranged that two of them meet in the same plane.

In some cases in a suitable position where their edges come opposite to one another, an interval may be left for the reception of an attachment plate $j$ having an eye $j^0$ to which the stay may be connected.

The plate is kept in position between the edges or flanges of the members, for example by rivetting.

In other cases the elements themselves may be pressed with flanges or edges which themselves constitute the attachment plates by means of the two superposed portions $f^1$ and $g^1$, furnished with eyelets $f^{10}$ and $g^{10}$ corresponding with one another.

The construction will depend upon the amount of force or strain which will be exerted by the stay. In the case of a relatively weak strain it will be necessary only to provide an inserted plate $j$. In the case of a relatively considerable strain, a pair of plates $f^1$ and $g^1$ may be provided which may be advantageously strengthened on the interior by a plate $k$ of strong material, such as steel, perforated with an eye corresponding to the eyes $f^{10}$ and $g^{10}$.

It is to be understood that the method of assembling the parts can be applied not only in the case of parts some of which only have their neutral axes intersecting at the same point, but also, and as shown in the drawing, to members in the case of which the neutral axes all intersect at the same point.

By the foregoing means an attachment joint is obtained which fulfils all requirements. The joint may if necessary be strengthened by means of counter plates or reinforcing plates $l$ attached by means of rivets $i$ at each side of the corresponding edges or flanges of the various members of the joint.

When applied to the construction of aircraft, a joint constructed as described possesses great rigidity. It permits in most cases, the usual tensioning wires or strainers to be dispensed with, which is an important advantage as where such tensioning arrangements are provided, any displacement causes a deformation of the whole of the framework.

What I claim and desire to secure by Letters Patent of the United States of America is:—

1. A joint or connecting device for assembling or attaching parts together comprising a plurality of metal elements provided with recesses in such a way that when the elements are fitted together they embrace and secure the ends of the parts to be assembled, an intermediate plate provided between two neighboring edges of two elements and means for attaching a stay to said plate.

2. A modified form of joint or connecting device, as claimed in claim 1, in which the elements are provided with neighbouring flanges and in which reinforcing plates are provided secured between the flanges and on the outside substantially as and for the purposes set forth.

3. A joint or connecting device for assembling or attaching parts together, comprising a plurality of elements which, when said elements are fitted together, form sockets to receive the ends of the parts to be connected, said elements being provided, at the edges of said recesses, with companion outwardly-extending flanges, and a reinforcing plate interposed between such companion flanges.

4. A joint or connecting device for assembling or attaching parts together, comprising a plurality of elements which, when said elements are fitted together, form sockets to receive the ends of the parts to be connected, said elements being provided, at the edges of said recesses, with companion outwardly-extending flanges, and reinforcing plates embracing such companion flanges.

In testimony whereof I have hereunto set my hand.

FELIX AMIOT.